A. HUPP.
SHAFT COUPLING.
APPLICATION FILED DEC. 29, 1913.
1,126,219.
Patented Jan. 26, 1915.
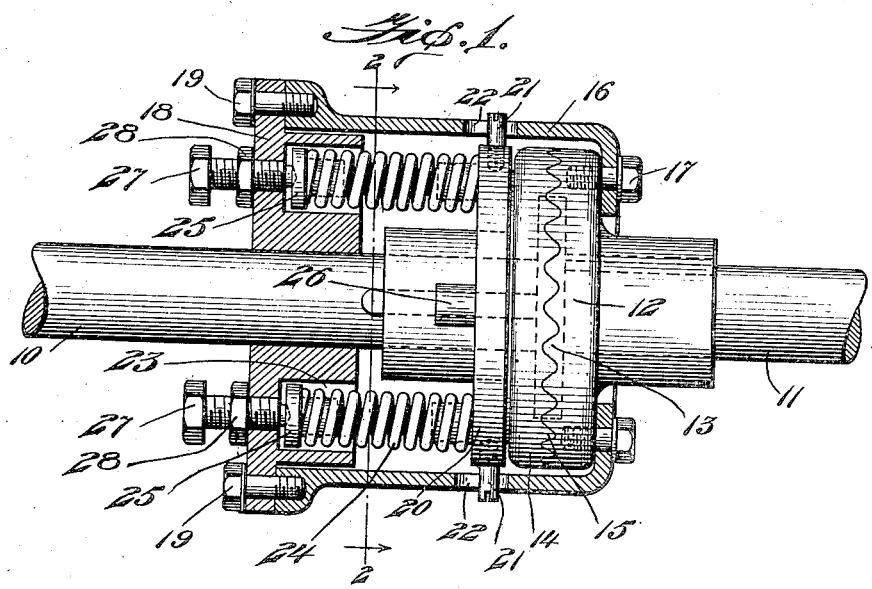
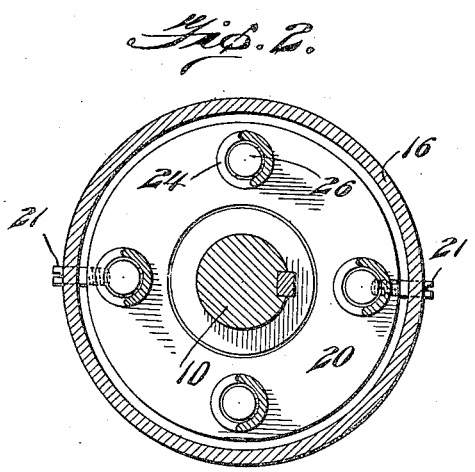
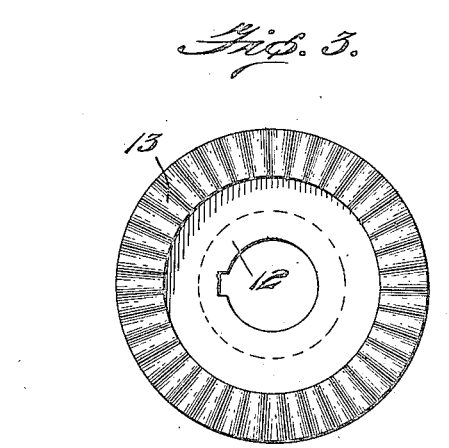
Witnesses
Inventor
Albert Hupp
by Foster Freeman Watson & Coit
Attorneys

UNITED STATES PATENT OFFICE.

ALBERT HUPP, OF WASHINGTON, DISTRICT OF COLUMBIA.

SHAFT-COUPLING.

1,126,219.

Specification of Letters Patent.

Patented Jan. 26, 1915.

Application filed December 29, 1913. Serial No. 809,289.

*To all whom it may concern:*

Be it known that I, ALBERT HUPP, a citizen of the United States, residing at Washington, District of Columbia, have invented certain new and useful Improvements in Shaft-Couplings, of which the following is a specification.

This invention relates to couplings for driving and driven members, and more particularly to that class of couplings which are adapted to yield to permit a certain amount of slippage between the driving and driven members when the load on the coupling becomes excessive.

The objects of the invention are to provide an improved coupling of this character which will be simple in construction and the parts of which will be thoroughly housed and so arranged that the load, at which the coupling will yield, may be varied by a simple adjustment of certain parts of the coupling.

The features of novelty of the invention will be evident from the following description, taken in connection with the accompanying drawings, wherein I have illustrated the preferred embodiment of my invention, it being understood that the construction and arrangement of the details may be varied considerably, and that my invention is not limited to the exact details shown and described.

In the drawings,—Figure 1 is a longitudinal section through the coupling; Fig. 2 is a transverse section on the line 2—2 of Fig. 1, and Fig. 3 is an end view of one of the clutch members.

Referring to the drawings, 10 and 11 indicate shaft members either of which may be a driving member and the other a driven member.

Keyed or otherwise secured to the member 11 is a clutch member 12 having teeth 13, the sides of which are preferably arranged at an angle of forty-five degrees to a plane at right angles to the axis of the shaft members.

The shaft member 10 has splined or otherwise slidably secured thereon a clutch member 14 having teeth 15 similar to the teeth 13 and coöperating therewith to form a driving connection between the shaft members.

A casing 16 is secured to the clutch member 12 by means of bolts 17 and incloses the clutch members. An end plate 18 is secured to the open end of the casing 16 by means of bolts 19.

A ring 20 loosely engages the clutch member 14 and is provided with radially projecting pins 21 which engage slots 22 in the casing 16 so as to rotate the ring with the casing.

The end plate 18 is provided with a plurality of recesses 23 on its inner side, these recesses receiving springs 24 which bear against suitable seats 25 and also against the ring 20, the latter being provided with pins 26 for holding the springs in position. Adjusting screws 27 have threaded engagement with the end plate 18 and bear against the seats 25, these screws being locked in position by means of the lock nuts 28.

It will be understood from the foregoing that the springs 24 and ring 20 rotate with the casing 16 and the clutch member 12 and that the springs will permit the clutch member 14 to move axially so that one clutch member may slip on the other. The ring 20 moves axially with the clutch member 14, the slots 22 being elongated for this purpose. By adjusting the screws 27 the pressure of the springs may be varied to change the load which will be transmitted by the coupling without slippage. The end plate 18 preferably fits the shaft 10 and is adapted to rotate thereon when the clutch members slip, this arrangement also holding the parts in alinement. If desired, the slots 22 may be covered for the purpose of excluding dust, etc., from the interior of the coupling.

It will be observed that the coupling described above is an automatic safety connection in the train of mechanism, by which the breaking of the driven mechanism is avoided in case it becomes clogged or comes in contact with an obstruction which would otherwise stop a part of it and would thus break some part of the mechanism. It will further be observed that while the coupling permits the mechanism beyond it to stop without breaking, it automatically reëngages so as to tend to drive the part beyond the coupling and it is not necessary for the operator to do anything in the way of resetting the coupling in order to make it operate as originally, after the obstruction, which prevented the operation of a part of the mechanism, is removed.

Having thus fully described my invention, what I claim is:—

1. A coupling comprising, in combination with the driving and driven members, a clutch member carried by one of said members, a second clutch member slidably secured on the other of said members, a ring rotatable with the first-named clutch member and slidable with the second clutch member, and a spring carried by the first-named clutch member and acting on said ring to yieldably hold the clutch members in engagement.

2. A coupling comprising, in combination with the driving and driven members, a clutch member carried by one of said members, a second clutch member slidably secured on the other of said members, a casing inclosing the clutch members and carried by one of the same, a ring rotatable with said casing and engaging the other of said clutch members, and a spring co-acting with said ring and said casing to yieldably hold the clutch members in engagement.

3. A coupling comprising, in combination with the driving and driven members, a clutch member carried by one of said members, a second clutch member slidably secured on the other of said members, a casing secured to the first named clutch member and inclosing both clutch members, a removable end plate for said casing, a ring loosely engaging the slidable clutch member and connected with the casing so as to rotate with the latter, and a spring coacting with said ring and said end plate to yieldably hold the clutch members in engagement.

4. A coupling comprising, in combination with the driving and driven members, a clutch member carried by one of said members, a second clutch member slidably secured on the other of said members, a casing inclosing the clutch members and carried by one of the same, an end plate closing the open end of said casing and secured thereto, a ring rotatable with the casing and loosely engaging the sliding clutch member, and a plurality of springs coacting with said ring and said end plate to yieldably hold the clutch members in engagement.

5. A coupling comprising, in combination with the driving and driven members, a clutch member carried by one of said members, a second clutch member slidably secured on the other of said members, a casing inclosing the clutch members and carried by one of the same, a ring rotatable with said casing and loosely engaging the sliding clutch member, a plurality of springs carried by said casing and engaging said ring, said springs yieldably holding the clutch members in engagement, and means for adjusting the tension of said springs.

6. A coupling comprising, in combination with the driving and driven members, a clutch member carried by one of said members, a second clutch member slidably secured on the other of said members, a casing inclosing the clutch members and carried by one of them, an end plate closing the open end of said casing and secured thereto, a ring rotatably arranged on the sliding clutch member and slidably connected with said casing, a plurality of springs engaging said ring, and adjustable devices carried by said end plate and engaging said springs so that the latter yieldably hold the clutch members in engagement.

In testimony whereof I affix my signature in presence of two witnesses.

ALBERT HUPP.

Witnesses:
ARTHUR L. BRYANT,
JOHN M. COIT.